US012791408B2

(12) United States Patent
Busetti et al.

(10) Patent No.: US 12,791,408 B2
(45) Date of Patent: Nov. 10, 2026

(54) OPTICAL FIBER EQUIPPED GEOMATERIAL TEST PLUG STANDARDS

(71) Applicant: SAUDI ARABIAN OIL COMPANY, Dhahran (SA)

(72) Inventors: Seth Busetti, Houston, TX (US); Arpita Bathija, Houston, TX (US); Harold Merry, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 563 days.

(21) Appl. No.: 18/066,019

(22) Filed: Dec. 14, 2022

(65) Prior Publication Data

US 2024/0201032 A1 Jun. 20, 2024

(51) Int. Cl.

*G01L 1/24* (2006.01)
*E21B 47/01* (2012.01)
*E21B 47/135* (2012.01)
*G01K 11/3206* (2021.01)

(52) U.S. Cl.

CPC .............. *G01L 1/242* (2013.01); *E21B 47/01* (2013.01); *E21B 47/135* (2020.05); *G01K 11/3206* (2013.01)

(58) Field of Classification Search

CPC ....... G01L 1/242; E21B 47/135; E21B 47/01; G01K 11/3206

See application file for complete search history.

(56) References Cited

U.S. PATENT DOCUMENTS

| | | | | |
|---|---|---|---|---|
| 5,900,556 | A | 5/1999 | Ahmad et al. | |
| 6,859,592 | B2 | 2/2005 | Seddon et al. | |
| 7,245,791 | B2 * | 7/2007 | Rambow | G01B 11/18 385/12 |
| 2011/0042061 | A1 * | 2/2011 | Martin | E21B 43/04 166/51 |
| 2014/0345388 | A1 * | 11/2014 | Den Boer | G01V 1/226 385/13 |
| 2019/0033543 | A1 * | 1/2019 | Freeland | G01H 9/004 |
| 2019/0063960 | A1 * | 2/2019 | Ramos | G02B 6/02395 |

(Continued)

FOREIGN PATENT DOCUMENTS

| | | | | |
|---|---|---|---|---|
| CN | 2636238 | Y | * | 8/2004 |
| JP | 2020041856 | A | | 3/2020 |

OTHER PUBLICATIONS

Labuschagne et al "Smart Monitoring of Sinkhole Formation Using Optic Fibre Technology", Proceedings of the 3rd International Conference (ICITG), Springer 2020.*

(Continued)

*Primary Examiner* — Michelle M Iacoletti
*Assistant Examiner* — Jarreas Underwood
(74) *Attorney, Agent, or Firm* — Osha Bergman Watanabe & Burton LLP

(57) ABSTRACT

A system includes a plug standard formed of a geomaterial, a fiber optic cable and a support lattice embedded within the plug standard, and a joint attached to an end of the fiber optic cable outside of the plug standard. The fiber optic cable captures at least strain measurements and temperature measurements of the plug standard. The support lattice supports the fiber optic cable within the plug standard, and the joint connects the fiber optic cable with a fiber optic interrogator.

19 Claims, 6 Drawing Sheets

(56) References Cited

U.S. PATENT DOCUMENTS

2021/0181372 A1* 6/2021 Barker .................... E21B 41/00

OTHER PUBLICATIONS

Lourdes et al "Fiber Optic Sensors Embedded in Textime-Reinforced Concrete for Smat Structural Health Monitoring: A Review", Sensors 2021, 21(15), 4948 (Year: 2021).*
Nowak et al "Hybrid Fiber Optic Cable for Strain Profiling and Crack Growth Measurement in Rock, Cement, and Brittle Installation Media", Sensors 2022, 22, 9685.*
Lourdes et al "Fiber Optic Sensors Embedded in Textile-Reinforced Concrete for Smart Structural Health Monitoring: A Review", Sensors 2021, 21(15), 4948.*
Becker, M.W. et al. "Laboratory Testing of Low Frequency Strain Measured by Distributed Acoustic Sensing," presented at the SEG International Exposition and 88th Annual Meeting, Anaheim, CA, Oct. 14-19, 2018 (4 pages).
Alwis, L.S.M. et al. 2021, "Fiber Optic Sensors Embedded in Textile-Reinforced Concrete for Smart Structural Health Monitoring: A Review," Sensors, 21, 4948, (24 pages).
Dean T. et al. 2016, "The Effect of Gauge Length on Axially Incident P-Waves Measured Using Fibre Optic Distributed Vibration Sensing," EAGE, Geophysical Prospecting, (10 pages).
Kishida, K. et al. 2014, "Study of Optical Fibers Strain-Temperature Sensitivities Using Hybrid Brillouin-Rayleigh System," Photonic Sensors, vol. 4, No. 1, 1-11 (11 pages).
Amer, R. et al. 2021, "Distributed Fiber Optic Strain Sensing for Geomechanical Monitoring: Insights from Field Measurements of Ground Surface Deformation," Geosciences, 11, 285, (14 pages).
Hartog, A.H., 2017, "An Introduction to Distributed Optical Fibre Sensors," CRC Press, (440 pgs).
Xue, Z. et al. 2018, "Fiber Optic Sensing for Geomechanical Monitoring: (1)-Distributed Strain Measuments of Two Sandstones under Hydrostatic Confining and Pore Pressure Conditions," Applied Sciences, 8, 2103, (18 pages).
Zhang et al., 2017, "Highly sensitive strain sensor based on helical structures combined with Mach-Zehnder interferometer in multicore fiber" Nature Scientific Reports, &:46633, p. 1-9 (9 pages).
Wang, Z. et al. 2020, "Recent Progress in Distributed Fiber Acoustic Sensing with ?-OTDR," Sensors, 20, 6594, (26 pages).
Uva, G. et al. 2014, "Structural Monitoring Using Fiber Optic Sensors of a Pre-Stressed Concrete Viaduct during Construction Phases," Case Studies in Nondestructive Testing and Evaluation, 2, p. 27-37 (11 pages).
Bremer, K. et al. "Structural Health Monitoring Using Textile Reinforcement Structures with Integrated Optical Fiber Sensors" Sensors 2017, 17, 345 (12 pages).
Bremer, K. et al. "Evaluating the Performance of Functionalized Carbon Structures with Integrated Optical Fiber Sensors under Practical Conditions" Sensors 2018, 18, 3923 (8 pages).

* cited by examiner

OPTICAL FIBER EQUIPPED GEOMATERIAL TEST PLUG STANDARDS

BACKGROUND

Hydrocarbon fluids are often found in hydrocarbon reservoirs located in porous rock formations below the Earth's surface. Hydrocarbon wells may be drilled to extract the hydrocarbon fluids from the hydrocarbon reservoirs and may be drilled by running a drill string, comprised of a drill bit and a bottom hole assembly, into a wellbore to break the rock and extend the depth of the wellbore. As the wellbore is created beneath the Earth's surface, rock core samples or rock plug samples are often collected and brought to the surface for examination. A rock plug sample is a cylindrical section of rock that is drilled and removed from the path of the wellbore. Further, several industries rely on the collection of rock plug samples in order to examine properties of the subsurface rock found at various depths in the subsurface environment.

Within a laboratory setting, rock plug samples may be experimented upon during rock mechanics tests. Such experimentation is useful in order to analyze the mechanical, thermomechanical, and poromechanical properties of differing rock plug samples under varying loading and environmental conditions.

SUMMARY

One or more embodiments of the present invention relate to a system including a plug standard formed of a geomaterial, a fiber optic cable and a support lattice embedded within the plug standard, and a joint attached to an end of the fiber optic cable outside of the plug standard. The fiber optic cable captures at least strain measurements and temperature measurements of the plug standard. The support lattice supports the fiber optic cable within the plug standard, and the joint connects the fiber optic cable with a fiber optic interrogator.

One or more embodiments of the present invention relate to a method including supporting a fiber optic cable by securing the fiber optic cable along a support lattice and creating a plug standard by forming a geomaterial around the support lattice such that that the fiber optic cable is embedded within the plug standard. The method further includes connecting the fiber optic cable embedded within the plug standard to a fiber optic interrogator by a joint attached to an end of the fiber optic cable outside of the plug standard and capturing at least strain measurements and temperature measurements of the plug standard by the fiber optic cable embedded within the plug standard.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in a well. In this respect, the term "upper" denotes an element disposed closer to the surface of the Earth than a corresponding "lower" element when in a downhole position, while the term "lower" conversely describes an element disposed further away from the surface of the well than a corresponding "upper" element. Likewise, the term "axial" refers to an orientation substantially parallel to the well, while the term "radial" refers to an orientation orthogonal to the well.

In one or more embodiments, this disclosure describes systems and methods for continuously measuring strain and temperature within a plug standard during laboratory testing by employing a geomaterial plug standard with an embedded fiber optic cable. In one or more embodiments, the system includes a plug standard, a fiber optic cable, a support lattice, and a joint. The techniques discussed in this disclosure are beneficial in reducing the total time required to manufacture plug standards in bulk, and thus, the associated costs. Further, the techniques discussed in this disclosure are beneficial as they minimize differences in the dimensions of the plug standards, the wind patterns of the fiber optic cable, and the epoxy applications that occur when plug standards are prepared as needed rather than in batches. In addition, the techniques discussed in this disclosure are beneficial as they reduce the likelihood of the fiber optic cable being damaged during experimentation by laboratory testing equipment.

Figure 1:
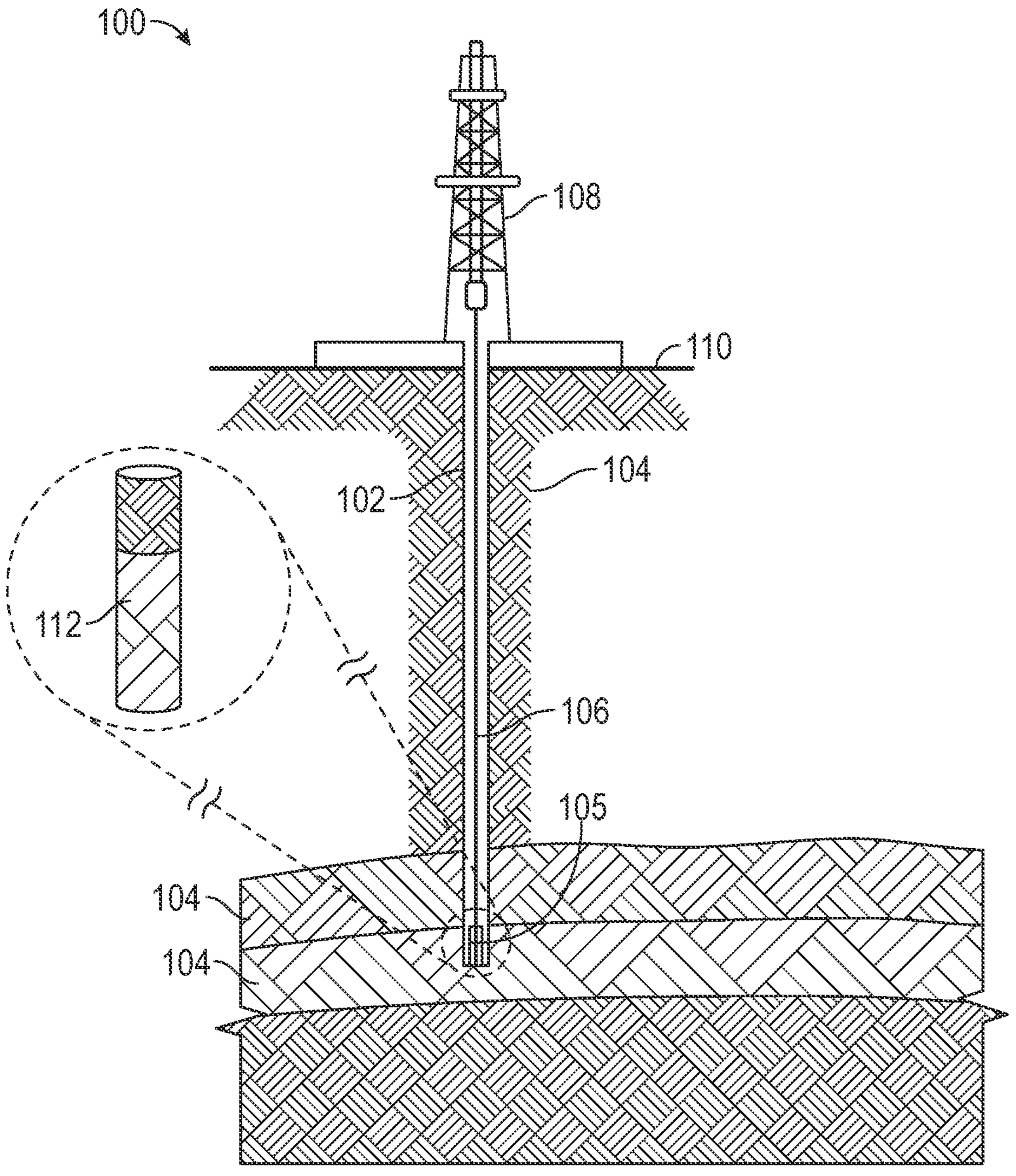
FIG. 1 shows an exemplary well site in accordance with one or more embodiments.

FIG. 1 shows an exemplary well site (100) in accordance with one or more embodiments. The well site (100) is shown as being on land. In other examples, the well site (100) could be shown as being offshore with the drilling being carried out with or without use of a marine riser. A drilling operation at a well site (100) includes drilling a wellbore (102) into a subsurface of various formations (104). The wellbore (102) may be drilled by a drill bit (105) attached by a drill string (106) to a drilling rig (108) located at a surface location (110). The surface location (110) is any location outside of the well, such as the Earth's surface. Throughout the drilling process, a rock plug sample (112) may be collected and sent to a surface location (110).

The rock plug sample (112) may be examined to determine a variety of reservoir characteristics relevant to reservoir characterization including porosity, permeability, or the presence of hydrocarbons. Porosity may indicate how much void space or pore space exists in a particular rock within the formation (104), where oil, gas, or water may be trapped. Permeability may indicate the ability of liquids and gases to flow through the rock within the area of interest. The rock plug samples (112) may be examined at the well site (100) or sent to a laboratory to perform different analyses, including rock mechanics tests.

Furthermore, in laboratory settings, it is a common practice to analyze plug standards. Plug standards refer to man-made samples, in the form of rock plug samples (112), with consistent dimensions, composition, and physical properties. Plug standards may be fabricated in bulk to create a number of samples with identical attributes and may be formed of a formation (104) material disposed within a well. In addition, plug standards may be formed of a geomaterial, such as concrete, cement, soil, crushed or unconsolidated rock, or any rock-like material.

As such, plug standards are frequently utilized in experiments examining different materials under varying loading and environmental conditions. In order to measure the resulting effects, the plug standards may include sensors, such as strain gauges or thermocouples. Alternatively, in order to capture strain and temperature measurements during experimentation, a fiber optic cable may be wrapped around and fixed to outer surfaces of a plug standard by epoxy or glue.

Figure 2:
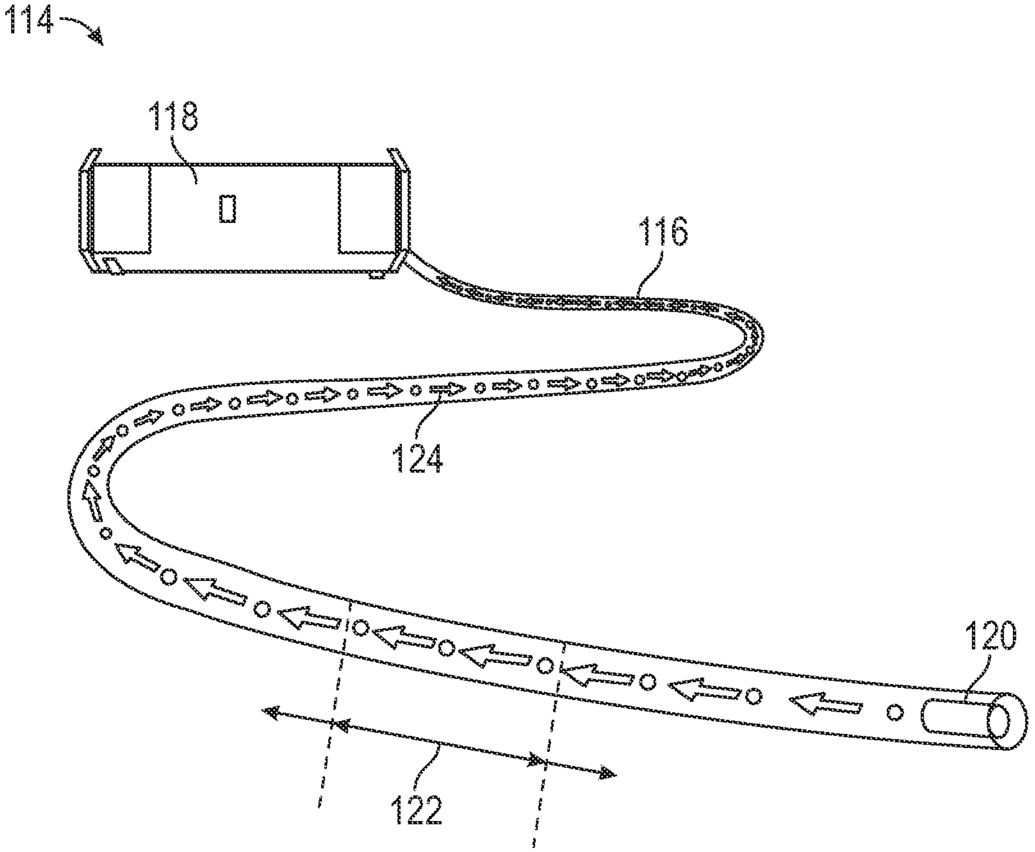
FIG. 2 shows a fiber optic sensing system in accordance with one or more embodiments.

FIG. 2 shows a fiber optic sensing system (114), in accordance with one or more embodiments. The fiber optic sensing system (114) may be used to sense a strain field resulting from forces applied to a rock plug sample (112) or plug standard during a rock mechanics test. The fiber optic sensing system (114) employs a fiber optic cable (116) to collect mechanical strain data along the fiber optic cable (116). The fiber optic cable (116) may be interrogated by a light source (e.g., a laser). An interrogator (118) sends pulses of light (120) down the fiber optic cable (116), and a small amount of the light is backscattered to the interrogator (118) from microheterogencities naturally present in the fiber optic cable (116). The strain field may disturb the fiber optic cable (116). For example, a perturbation in the environment surrounding the fiber optic cable (116) may result in strain, i.e., an elongation (122) of the fiber optic cable (116) in an axial direction during deformation of the rock plug sample (112) or plug standard, thereby causing a variation in the backscatter (124). The backscatter (124) may be analyzed and interpreted to turn light information back into information about the strain field. Specifically, the interrogator (118) may measure the changes in the backscatter (124) (amplitude, delay, and/or phase, etc.) caused by the strain (elongation (122)). There may be various causes for the strain. For example, a propagating seismic wave or a mechanical, thermal, or hydraulic strain in the environment surrounding the fiber optic cable (116) may cause the strain in the fiber optic cable (116), resulting in a change of the travel time of the pulses of light (120).

As is commonly known in the art, high resolution Distributed Fiber Optic Sensing (DFOS) has been employed in the field and in the laboratory to record strain and temperature changes. This may be accomplished through the use of Rayleigh, Brillouin, and hybrid Rayleigh-Brillouin optical backscattering techniques which measure frequency shifts caused by strain and heat perturbations within fiber optic cables (116) at high spatial resolutions. In addition, Raman backscattering may be utilized, as this method is the most common for measuring temperature variations. Further, a range of suitable Distributed Strain Sensing (DSS) and Distributed Temperature Sensing (DTS) methods are capable of making continuous measurements during rock mechanics tests.

During rock mechanics testing, triaxial compression tests are frequently performed. Triaxial compression tests investigate the behavior of geomaterials in a three-dimensional stress state as samples (often plug standards) are axially loaded to failure while a confining pressure is applied constantly. Typically, axial strain within the sample is calculated from the variation of the height of sample during testing. Radial strain is generally measured at discrete points of the sample by strain gauges, and the temperature of the sample is measured by discrete thermocouples. However, continuous strain measurements around the sample cannot be captured using conventional triaxial deformation techniques.

Accordingly, embodiments disclosed herein present systems (125) and methods that are capable of continuous strain and temperature measurements within a plug standard (126) during laboratory testing by employing a geomaterial plug standard (126) with an embedded fiber optic cable (116) (FIGS. 3-6). The system (125) can be manufactured in bulk for consistent test conditions. As such, the system (125) minimizes differences in the dimensions of the plug standards (126), the wind patterns of the fiber optic cable (116), and the epoxy applications that occur when samples are prepared as needed rather than in batches. Further, since the fiber optic cable (116) is embedded within the plug standard (126), the system (125) also eliminates the need to glue the fiber optic cable (116) to an outside surface of the plug standard (126), and thus, the system (125) reduces the likelihood of the fiber optic cable (116) being damaged by laboratory testing equipment during rock mechanics tests.

Figure 3:
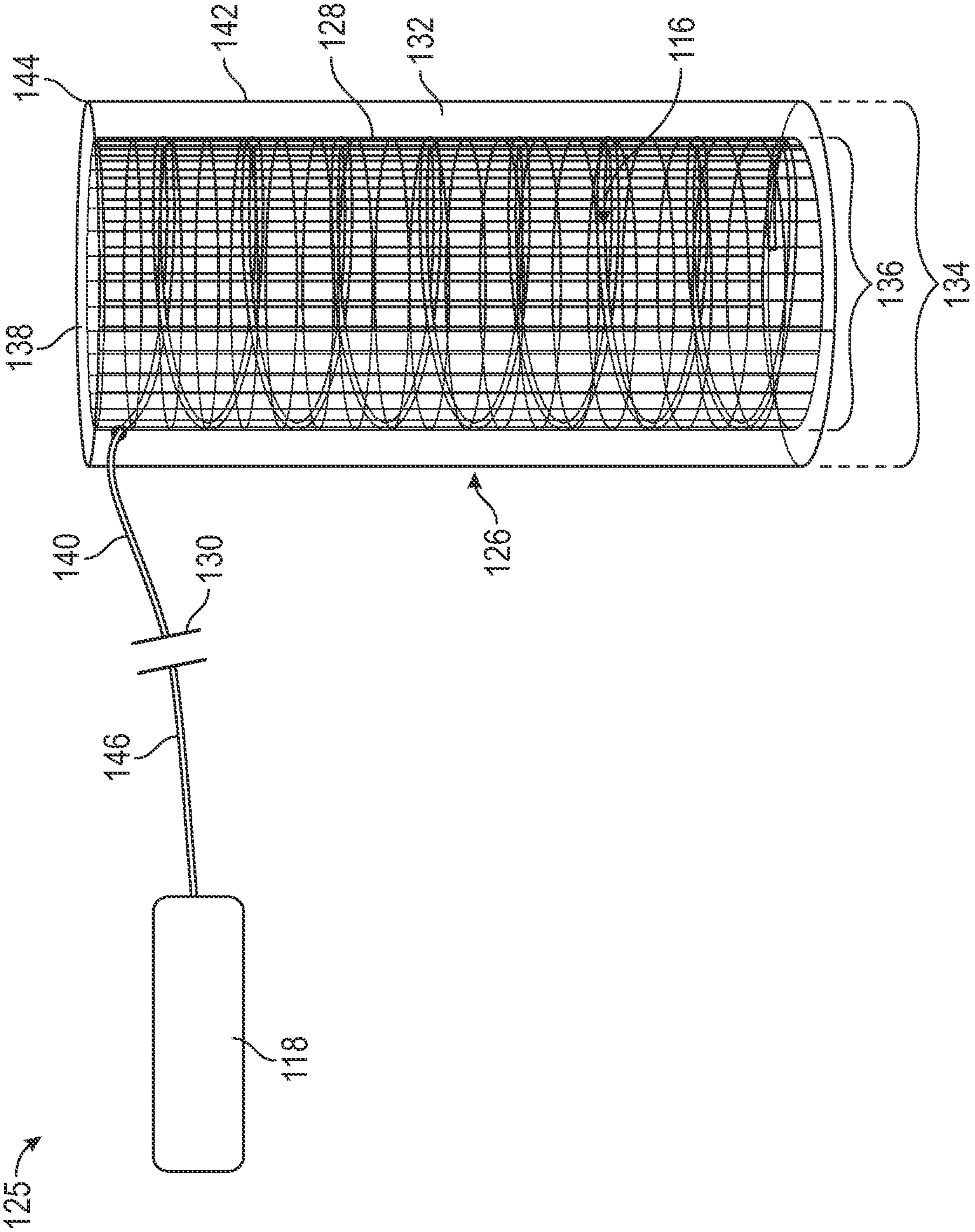
FIG. 3 shows a cross-sectional view of the system in accordance with one or more embodiments of the present disclosure.

FIG. 3 shows a cross-sectional view of the system (125) in accordance with one or more embodiments of the present disclosure. The system (125) includes a plug standard (126), a fiber optic cable (116), a support lattice (128), and a joint (130). The plug standard (126) of the system (125) is formed of a geomaterial (132). The geomaterial (132) may be concrete, cement, soil, crushed or unconsolidated rock, or any rock-like material. Here, in FIG. 3, the geomaterial (132) is cement. Generally, the plug standard (126) is cylindrically shaped, as to fit within common rock mechanics testing equipment found in laboratories. Further, the plug standard (126) is formed of known dimensions. Similar to plug standards in practice, the dimensions of the plug standard (126) of the present invention may be a 1:2 ratio of height to diameter in order to minimize boundary effects at the ends of the plug standard (126). For example, the plug standard may be 2 inches tall with a diameter of 1 inch. However, other dimensions are possible depending on testing requirements. In addition, the geomaterial (132) of the plug standard (126) includes consistent material specifications throughout the plug standard (126). This may include mechanical, thermomechanical, and poromechanical material specifications.

The fiber optic cable (116) of the system (125) may be any fiber optic cable (116) known in the art. Additionally, the fiber optic cable (116) is embedded within the plug standard (126) of the system (125). In this way, the fiber optic cable (116) may capture at least strain measurements and temperature measurements continuously within the plug standard (126) by any of the methods previously discussed while rocks mechanics tests are performed upon the plug standard (126). Further, the length of the fiber optic cable (116) embedded within the plug standard (126) may depend upon the selected measuring method and its respective spatial resolution. In order to capture continuous sampling within the plug standard (126), the fiber optic cable (116) of the system (125) will sample 10 or more points within the plug standard (126). However, the fiber optic cable (116) may at minimum sample 3 points within the plug standard (126).

A support lattice (128) is also embedded within the plug standard (126). The support lattice (128) may be formed of a thin wire mesh and is designed to support the fiber optic cable (116) within the plug standard (126) without affecting the overall stiffness or strength of the plug standard (126). The wire mesh may be formed of a polymer material. In the non-limiting example depicted in FIG. 3, the support lattice (128) is tubularly shaped. As such, a cross-section (134) of the plug standard (126) is larger than a cross-section (136) of the support lattice (128) such that the support lattice (128) may fit within the plug standard (126). Further, the fiber optic cable (116) is helically wrapped along the support lattice (128). However, the fiber optic cable (116) may be wrapped in alternative fashions, depending on the application of the plug standard (126). Accordingly, the fiber optic cable (116) is secured to the support lattice (128) such that the fiber optic cable (116) may extend a total length of the support lattice (128). In a non-limiting example, the fiber optic cable (116) may be secured to the support lattice (128) by threading the fiber optic cable (116) through the wire mesh of the support lattice (128), gluing the fiber optic cable (116) to the support lattice (128), or a combination of threading and gluing.

In some embodiments, a lower end of the support lattice (128) is situated against a lower end of the plug standard (126). In some embodiments, the lower end of the support lattice (128) may be situated above the lower end of the support lattice (128). In some embodiments, the support lattice (128) may extend a total length of the plug standard (126). In some embodiments, the total length of the support lattice (128) may be less than the total length of the plug standard (126). Further, in some embodiments, the support lattice (128) may extend beyond an upper surface (138) of the plug standard (126).

In any case, an end (140) of the fiber optic cable (116) extends outside of the plug standard (126) in order to connect to a fiber optic interrogator (118) disposed outside of the plug standard (126). The end (140) of the fiber optic cable (116) may pass through an outer surface (142) of the plug standard (126), as shown in FIG. 3, the upper surface (138) of the plug standard (126), or a corner (144) of the plug standard (126) depending on the orientation of the support lattice (128) or the wrapping pattern of the fiber optic cable (116). The outer surface (142) of the plug standard (126) is defined as the surface of the plug standard (126) that extends in the axial direction of the plug standard (126). Further, the corner (144) of the plug standard (126) is defined as the edge between the outer surface (142) and the upper surface (138).

The end (140) of the fiber optic cable (116) is attached to a joint (130) outside of the plug standard (126). The joint (130) serves to connect the fiber optic cable (116) and the fiber optic interrogator (118). The interrogator (118) sends pulses of light (120) down the fiber optic cable (116) and collects and measures changes among the backscatter (124) in order to record at least strain measurements and temperature measurements of the plug standard (126). A lead (146) of necessary length extends from the fiber optic interrogator (118) to the joint (130) in order to connect the embedded fiber optic cable (116) to the fiber optic interrogator (118). The joint (130) may be any joint (130) known in the art capable of connecting a fiber optic cable (116) and a lead (146) of a fiber optic interrogator (118).

Figure 4:
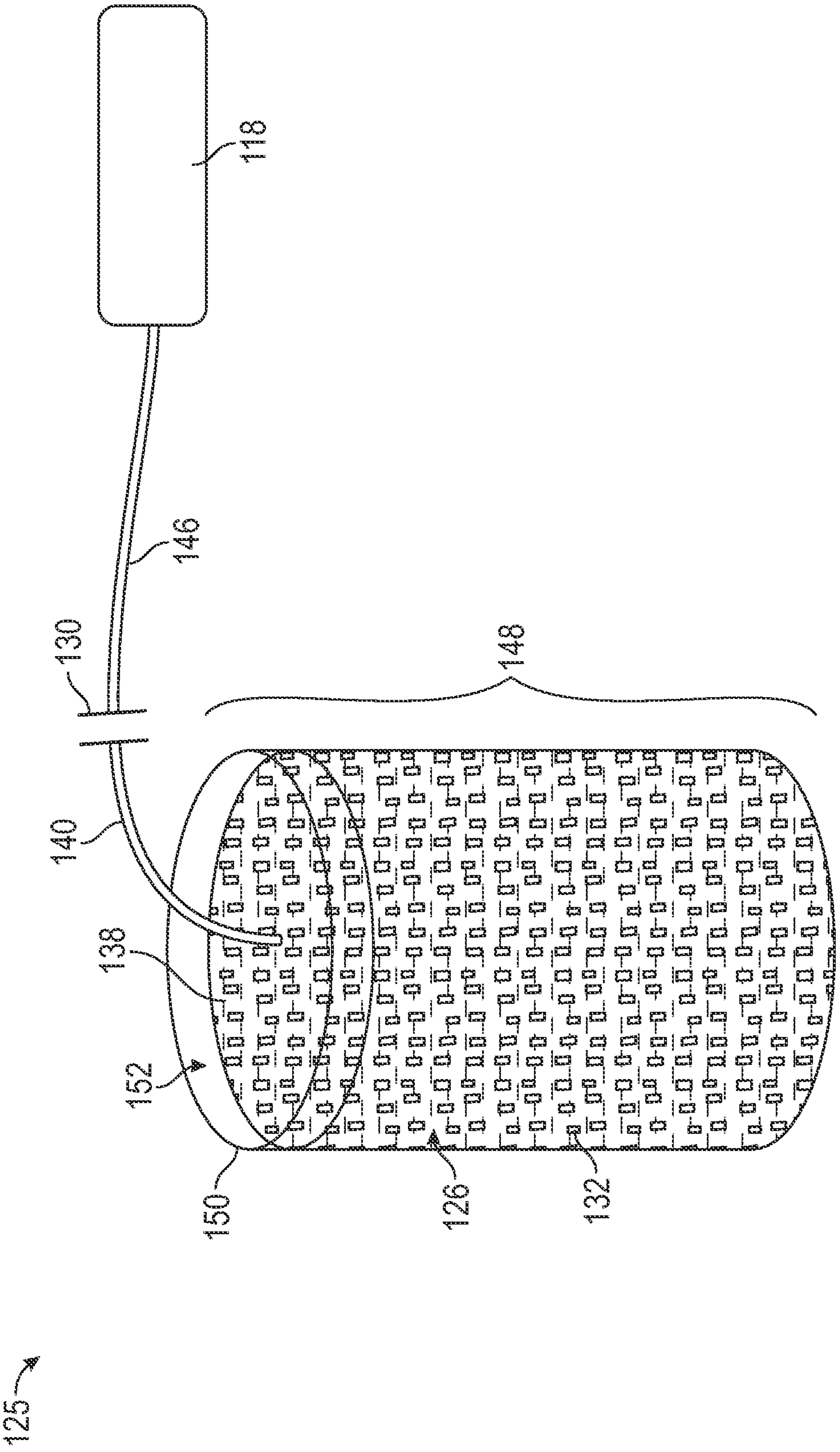
FIG. 4 shows the system in accordance with one or more embodiments of the present disclosure.

FIG. 4 depicts the system (125) in accordance with one or more embodiments of the present disclosure. Here, the system (125) includes a mold (148) which serves to shape and support the plug standard (126). The mold (148) includes a body (150) that may be formed of a polymer or metal material. The body (150) of the mold (148) includes a cavity (152) in the shape of the plug standard (126). In addition, the body (150) of the mold (148) may include a plurality of cavities (152), such that a single mold (148) may shape and support a plurality of plug standards (126).

The mold (148) may be employed to form the plug standard (126). That is, the support lattice (128) wrapped with the fiber optic cable (116) is placed within the mold (148), and subsequently the geomaterial (132) is poured into the mold (148) around the support lattice (128), thereby forming the system (125), and thus the plug standard (126). If the geomaterial (132) is a loose material, such as soil, crushed rock, or unconsolidated rock, the plug standard (126) may remain within the mold (148) for testing. In this case, the mold (148) is shaped such that the mold (148) may fit within or cooperate with the testing equipment. Alternatively, the geomaterial (132) of the plug standard (126) is a loose material, the plug standard (126) may be removed from the mold (148) for testing if the outer surface (142), as well as the upper surface (138) and a lower surface of the plug standard (126) are coated with an epoxy or wrapped in a sealant. In this way, the shape of the geomaterial (132) may be maintained. However, if the geomaterial (132) is designed to solidify, such as cement or concrete, then the plug standard (126) may be removed from the mold (148) subsequent to the geomaterial (132) hardening and prior to testing.

In FIG. 4, the geomaterial (132) of the plug standard (126) is an unconsolidated material. Here, the plug standard (126) is set to remain within the mold (148) during testing of the system (125). In addition, in this embodiment, the end (140) of the fiber optic cable (116) exits the plug standard (126) through the upper surface (138) of the plug standard (126).

Figure 5:
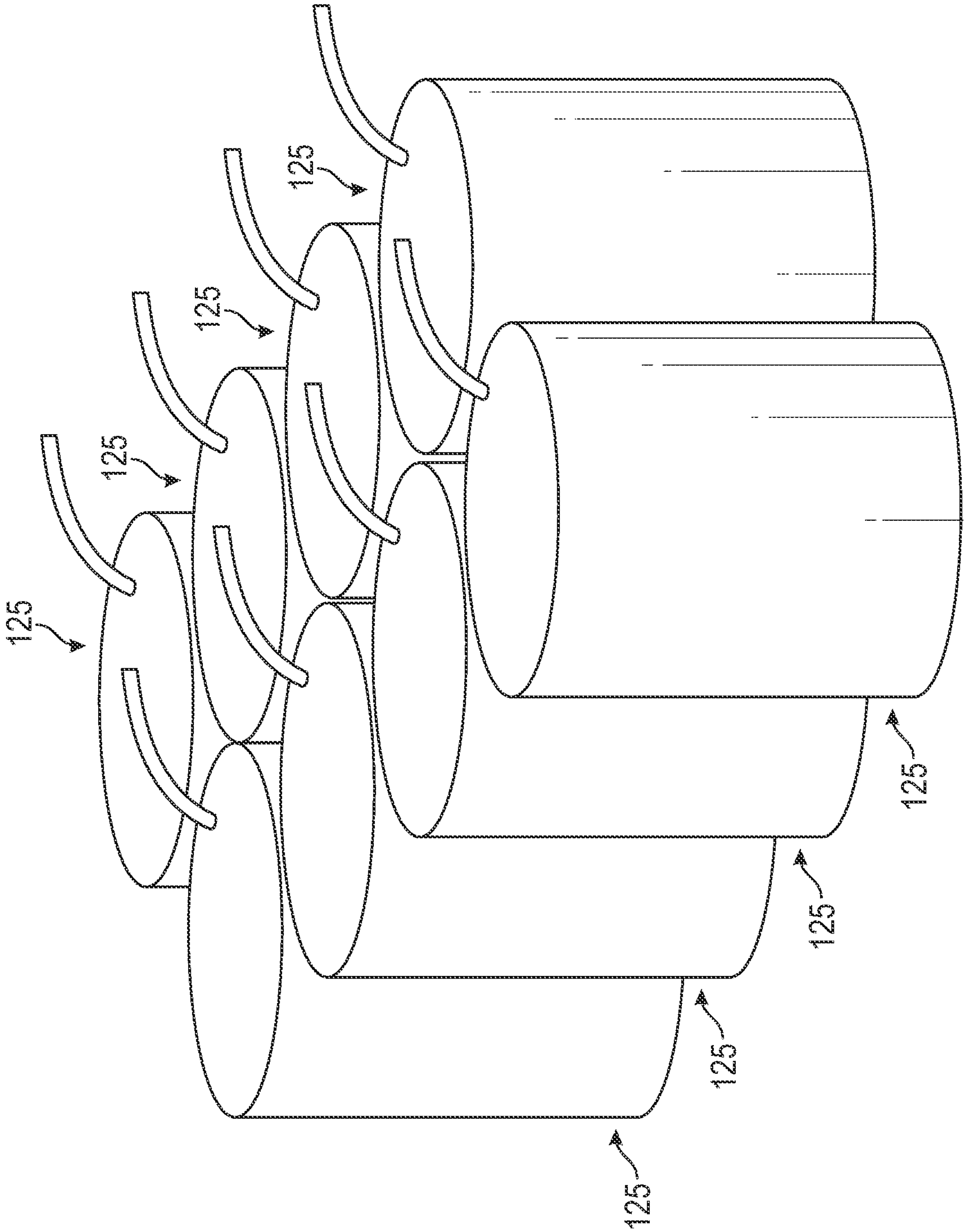
FIG. 5 shows the system in accordance with one or more embodiments of the present disclosure.

The system (125) consists of a plug standard (126) with known dimensions and consistent material specifications with an embedded optical fiber of consistent fiber specifications. Therefore, the system (125) may be manufactured in bulk for consistent experiments. FIG. 5 shows several systems (125) previously prepared in bulk. Here, each system (125) includes a plug standard (126) formed of a similar geomaterial (132). In addition, in each system (125), the end (140) of the fiber optic cable (116) exits the plug standard (126) at a corner (144).

Each plug standard (126) of the bulk of systems (125) may have been produced within a mold (148) including a single cavity (152) sequentially. Alternatively, the bulk of systems (125) may have been produced concurrently by a mold (148) in which the body (150) of the mold (148) includes a plurality of cavities (152). In this way, a plurality of plug standards (126) may be formed simultaneously while employing a single mold (148).

A bulk of systems (125) may be used for enhanced laboratory testing of geomaterials (132). For example, the DFOS of the system (125) may permit testing of a range of laboratory sensitivities such as strain rate, temperature, confinement effects, saturation, load cycling, and soil consolidation and relaxation. In addition, the DFOS and plug standards (126) of the systems (125) may permit new experiments to be conducted using well-behaved geomaterials (132) with known behaviors to test for ultrasonic velocities, fracture propagation characteristics, acoustic emissions, and permeability. Further, a bulk of systems (125) may be employed to design and analyze new materials, perform numerical simulations, and calibrate new equipment, such as new forms of strain gauges, thermocouples, and piezoelectric devices.

Additionally, the systems (125) and methods discussed herein may be utilized for calibration of fiber optic interrogators (118) and processing schemes. That is, a bulk of systems (125) may be employed to compare sensitivities of different fiber optic-based measurement techniques using a same interrogator (118) under different laser pulse settings. Also, a bulk of systems (125) may be used to compare the sensitivities of the same fiber optic-based measurement techniques using different interrogators (118). Further, a bulk of systems (125) may be utilized to calibrate a DFOS system using common standards with known results.

Figure 6:
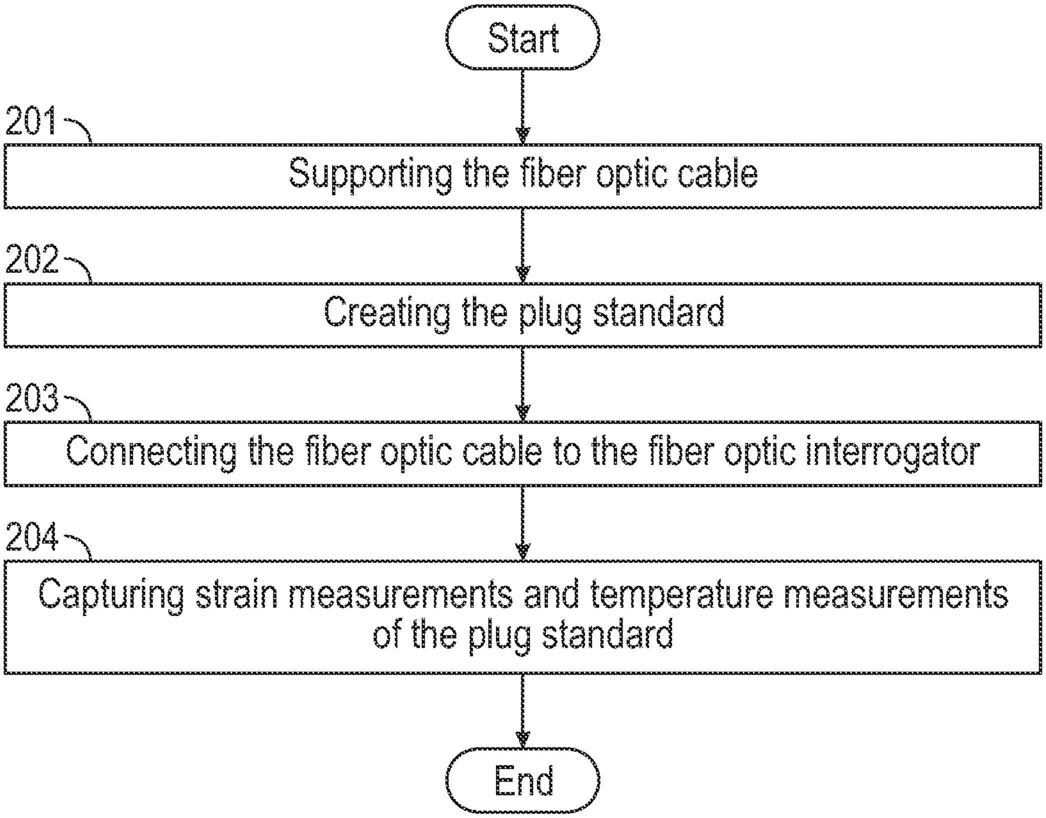
FIG. 6 shows a flowchart of a method in accordance with one or more embodiments of the present disclosure.

FIG. 6 depicts a flowchart showing a method capturing continuous strain and temperature measurements within a plug standard (126) during laboratory testing by employing a plug standard (126) with an embedded fiber optic cable (116). While the various flowchart blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In block 201, a fiber optic cable (116) is secured to a support lattice (128). The fiber optic cable (116) may be helically wrapped along the support lattice (128). In other embodiments, the fiber optic cable (116) may be wrapped along the support lattice (128) with a different pattern, depending on the application of the system (125).

In block 202, a plug standard (126) is created by a forming a geomaterial (132) around the fiber optic cable (116) and support lattice (128). This may be accomplished by first placing the fiber optic cable (116) and support lattice (128) within a cavity (152) of a mold (148). Next, the geomaterial (132) may be poured into the cavity (152) of the mold (148) around the fiber optic cable (116) and the support lattice (128), thereby embedding the fiber optic cable (116) within the newly formed plug standard (126). In addition, a bulk of plug standards (126) may be formed concurrently. This may be accomplished by employing a mold (148) that includes a body (150) having a plurality of cavities (152).

In block 203, the embedded fiber optic cable (116) is connected to a fiber optic interrogator (118) disposed outside of the plug standard (126). An end (140) of the embedded fiber optic cable (116) may exit the plug standard (126) through an outer surface (142), an upper surface (138), or a corner (144) of the plug standard (126). As such, the end (140) of the fiber optic cable (116) is connected to a lead (146) of the fiber optic interrogator (118) by a joint (130).

In block 204, the system (125) may be utilized to calibrate the fiber optic interrogator (118) and to conduct rock mechanics tests to analyze characteristics of different geomaterials (132). During rock mechanics tests, the embedded fiber optic cable (116) and the fiber optic interrogator (118) capture at least strain measurements and temperature measurements of the plug standard (126). Further, a system (125) or a bulk of systems (125) may be utilized to measure additional characteristics of varying geomaterials (132), such as confinement effects, saturation, load cycling, soil consolidation and relaxation, ultrasonic velocities, fracture propagation characteristics, acoustic emissions, and permeability.

If the geomaterial (132) of the plug standard (126) is formed of a loose material, the plug standard (126) may remain within the mold (148) during testing or calibration of the system (125). Alternatively, if the geomaterial (132) of the plug standard (126) is solid or solidified subsequent to being poured into the mold (148), the plug standard (126) may be removed from the mold (148) prior to testing or calibration of the system (125)

Accordingly, the aforementioned embodiments as disclosed relate to systems (125) and methods useful for continuously capturing strain and temperature measurements within a plug standard (126) during laboratory testing by employing a plug standard (126) with an embedded fiber optic cable (116). The aforementioned embodiments may be employed for enhanced laboratory testing of geomaterials (132) and calibration of fiber optic interrogators (118) and processing schemes. Advantageously, the disclosed systems (125) and methods may be manufactured in bulk for consistent test conditions, thereby reducing the total time required to produce a plurality of plug standards (126). As such, the system (125) minimizes differences in the dimensions of the plug standards (126), the wind patterns of the fiber optic cables (116), and the epoxy applications that occur when samples are prepared as needed rather than in batches. Further, the disclosed systems (125) and methods advantageously reduce the likelihood of the fiber optic cable (116) being damaged by laboratory testing equipment during rock mechanics tests as the fiber optic cable (116) is embedded within the plug standard (126).

Although only a few embodiments of the invention have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system comprising:

a plug standard formed of a geomaterial, the plug standard comprising consistent dimensions, composition, and physical properties to a rock plug sample collected from a reservoir;

a fiber optic cable embedded within the plug standard, the fiber optic cable configured to capture at least strain measurements and temperature measurements of the plug standard;

a support lattice disposed within the plug standard and affixed to the fiber optic cable during formation of the plug standard, the support lattice configured to position and retain the fiber optic cable within the plug standard; and a joint attached to an end of the fiber optic cable outside of the plug standard, the joint configured to connect the fiber optic cable with a fiber optic interrogator.

2. The system according to claim 1, wherein the plug standard is cylindrically shaped.

3. The system according to claim 1, wherein the geomaterial is a solid material.

4. The system according to claim 1, wherein the geomaterial is a loose material.

5. The system according to claim 1, wherein the end of the fiber optic cable exits the plug standard through an upper surface of the plug standard.

6. The system according to claim 1, wherein the end of the fiber optic cable exits the plug standard through an outer surface of the plug standard.

7. The system according to claim 1, wherein a cross-section of the plug standard is larger than a cross-section of the support lattice.

8. The system according to claim 1, wherein a lower end of the support lattice is situated above a lower end of the plug standard.

9. The system according to claim 1, wherein the support lattice extends a total length of the plug standard.

10. The system according to claim 1, wherein the support lattice is formed of a mesh frame.

11. The system according to claim 10, wherein the fiber optic cable is helically wrapped along the support lattice.

12. The system according to claim 1, wherein the system further comprises a mold configured to shape and support the plug standard.

13. The system according to claim 12, wherein the mold is formed of a body having a cavity defined therein.

14. A method comprising:

supporting a fiber optic cable by securing the fiber optic cable along a support lattice;

forming a plug standard by forming a geomaterial around the support lattice such that that the fiber optic cable is embedded within the plug standard, the plug standard comprising consistent dimensions, composition, and physical properties to a rock plug sample collected from a reservoir;

during formation of the plug standard, affixing the fiber optic cable to the support lattice for positioning and retaining the fiber optic cable within the plug standard;

connecting the fiber optic cable embedded within the plug standard to a fiber optic interrogator by a joint attached to an end of the fiber optic cable outside of the plug standard; and capturing at least strain measurements and temperature measurements of the plug standard by the fiber optic cable embedded within the plug standard.

15. The method according to claim 14, wherein securing the fiber optic cable along the support lattice comprises helically wrapping the fiber optic cable around the support lattice.

16. The method according to claim 14, wherein creating the plug standard by forming a geomaterial around the support lattice comprises pouring the geomaterial into a mold.

17. The method according to claim 16, further comprising inserting the support lattice within the mold prior to pouring the geomaterial into the mold.

18. The method according to claim 16, further comprising, subsequent to the geomaterial solidifying, removing the plug standard from the mold prior to capturing at least strain measurements and temperature measurements of the plug standard.

19. The method according to claim 16, further comprising housing the plug standard within the mold while capturing at least strain measurements and temperature measurements of the plug standard when the geomaterial is a loose material.

* * * * *